3,041,159
PRODUCTION OF NON-CAKING FERTILIZER BY USE OF ATTAPULGITE CLAY

Homer A. Smith, Berkeley Heights, N.J., assignor to Minerals & Chemicals Philipp Corporation, Menlo Park, N.J., a corporation of Maryland
No Drawing. Filed Jan. 21, 1958, Ser. No. 710,201
10 Claims. (Cl. 71—64)

This invention relates to new composition of matter, such composition consisting of discrete material which tends to coalesce due to heat, pressure or moisture in the surrounding atmosphere and finely-divided particles of a mineral material coating particles of said discrete material to form a continuous barrier around each of the particles of the first mentioned material to prevent coalescence due to heat, pressure or moisture absorption thereby.

My invention is of very wide application, having utility in the provision of new compositions of matter in numerous fields. One of the fields in which my invention is useful is in the manufacture of fertilizers and purely for purposes of explanation and illustration I shall explain the invention in connection with its employment in granular fertilizer manufacture.

Mixed fertilizers may be made by assembling and admixing in a reactor ingredients, such, for example, as potash, superphosphate, ammonium sulphate and a solution of ammonium nitrate and aqueous ammonia. The thus admixed ingredients are delivered from the reactor, either through a cooler or not as desired, onto a stockpile where the fertilizer is cooled. The fertilizer is hygroscopic and tends to absorb moisture from the surrounding atmosphere. The fertilizer in the pile becomes caked and has to be ground up after which it is bagged for shipment. Preferably, the mixed fertilizer is prepared as a granular material usually within the range of from about 5-35 mesh. It has been found that granular hygroscopic material is more resistant although still highly susceptible to caking. The bagged fertilizer is hygroscopic and becomes caked in the bags due to heat, pressure or moisture absorption which seriously impairs its utility as is known to those skilled in the art. Many attempts have been made to eliminate the tendency of the fertilizer to become caked in the bags but none has been fully successful.

An analogous problem exists in the storage of other hydrogscopic fertilizers exemplified by ammonium nitrate, urea, ammonium sulfate, ammonium phosphate, sodium nitrate and potassium chloride. The tendency towards setting or caking has restricted the use of such plant nutrient sources since in the caked condition such salts are not amenable to even field distribution. Although in recent years such fertilizer salts have become available in granular form or in macrocrystalline form, to thereby reduce the point of contact between particles, the problem although somewhat minimized is by no means eliminated. Granules of ammonium nitrate, for example, even when calcium carbonate is intimately admixed therewith absorb moisture and cake together during exposure to heat, pressure or an atomsphere of relatively high humidity.

The tendency of hygroscopic materials to coalesce is caused by the varying ambient conditions of temperature and humidity and the effects of pressure. Changes of temperature and humidity upward cause greater absorption of water in which a portion of the crystals become dissolved. With subsequent lowering of temperature and humidity the dissolved material recrystallizes and coalesces with the existent granules or other recrystallized material. This is the basis of the phenomenon of caking. When fertilizer is stored over long periods of time this process repeats itself and becomes more pronounced until the bag of fertilizer becomes a solid cohesive mass.

It has heretofore been proposed to incorporate in the fertilizer in the reactor a conditioner designed to act as a medium to physically separate particles of fertilizer and thereby inhibit caking of the fertilizer due to coalescence because of the action of heat, pressure or moisture in the surrounding atmosphere; conditioners which have been employed include cocoanut shell meal, ground rice hulls, ground tobacco stems and other similar organic materials. It has also been suggested to condition fertilizers by coating particles thereof with finely-divided kaolin clay or diatomaceous earth. Such practice is advantageous when the fertilizer is of a potentially explosive character when associated with organic materials. Such prior art inorganic coating conditioners have not always adequately performed their intended function and in order to bring about satisfactory results it has been necessary to employ an undesirably large quantity of conditioner, usually from 3 to 5% based on the weight of the material coated. The conditioner has little or no value as fertilizer and is, accordingly, an undesirable ingredient. Since it becomes a part of the bagged material its shipment represents material increase in shipping expense. Also, it acts as a diluent reducing the efficacy of the fertilizer.

Accordingly, a principal object of the subject invention is the provision of a method for preventing the caking of granular water-soluble material. A further and more specific object is the provision of a method for preventing the caking or setting of hygroscopic granular fertilizer. Another object is the provision of a composition of matter comprising a hygroscopic material and an improved conditioning agent therefor. A further object is to provide a granular hygroscopic fertilizer coated with a small but effective quantity of anti-caking material.

I have found that the tendency of fertilizer to coalesce due to heat, pressure or moisture in the surrounding atmosphere may be effectively counteracted by utilizing a continous sorptive clay mineral coating around the fertilizer granules. This may be accomplished by intimately associating the fertilizer surface with an activated finely-divided sorptive clay mineral which possesses adequate tenacity to cling to the fertilizer surfaces. The mineral particles are sufficiently small and are present in quantity sufficient to form a continuous sorptive barrier around each of the particles of the fertilizer. The mineral by virtue of being non-colloidal does not spall, gel or otherwise lose its physical form in the presence of large quantities of moisture so that the appearance and handling of the composited fertilizer is not adversely affected by the presence of the mineral additive. A relatively small amount of my finely-divided mineral accomplishes results superior to those previously accomplished by quantities of conditioners several times as great as the quantity of finely-divided material which I use.

I employ as the finely-divided material activated Attapulgus fuller's earth, a clay material mined principally in Southwest Georgia and Northern Florida. The Attapulgus fuller's earth consists essentially of the mineral attapulgite, a hydrous aluminum silicate of needle-like crystalline structure. When a substantial portion of the water of hydration thereof is removed by thermal treatment the colloidal properties of the mineral are lost and the sorptivity is in general increased. The V.M., or volatile matter, of the raw earth as mined is usually about 50%, V.M. being the loss of weight, expressed on a percentage basis, of the earth when heated to essentially constant weight at about 1800° F. When the V.M. of the clay is lowered to about 7%, suitably by heating for about an hour at a temperature within the range of from about 600°–1000° F. and preferable from about 700–950° F., the colloidal properties of the earth are lost and the resultant material is activated and otherwise rendered more valuable than colloidal non-activated earth for the purposes of my invention. It will be understood that my invention is not restricted to the use of the pure mineral attapulgite suitably activated since Attapulgus fuller's earth which may contain in addition to attapulgite up to about 20% of a bentonitic clay may be used. Bentonite clays are distinguished from Attapulgus clays in that certain montmorillonites are their chief mineral constituents. I have found that other clays, activated or non-activated, will not perform as satisfactorily in compositions of my invention.

I have found that very satisfactory results are obtained using Attapulgus fuller's earth as a conditioner when said earth has been heat treated to modify its colloidal properties and has been ground by fluid energy milling to a fineness such that a preponderating amount by weight is finer than about 15 microns, with the amount under about 5 microns a minor percentage by weight (all percentages based on total weight of the conditioner and particle sizes referring to equivalent spherical diameter as determined by Andreason sedimentation method using 2.5 as a value for $\rho$). A preferred conditioner is one having an average equivalent spherical diameter of about 8 microns or in the order of about 7–9 microns, and which includes no more than about 20–30 percent by weight of particles under about 3 microns. I have found that ammonium nitrate, for example, is not effectively conditioned by the same activated earth milled to produce a coarser grade material, e.g., of such fineness that the average equivalent spherical diameter is about 18 microns and the amount finer than 15 microns a minor percentage. When at least 50 percent of the activated earth is 3 microns or less than the ability of the earth to provide cake resistant coated compositions is minimized because of the tendency of the very fine calcined earth particles to re-agglomerate. This phenomenon of reagglomeration is characteristic of extremely finely-divided Attapulgus fuller's earth and is believed to be caused by the entanglement of individual needles produced by very fine grinding. The agglomerates appear as macrospheres, each macrosphere composed of a multiplicity of individual needles. When granular materials are coated with such agglomerates it is found that the conditioning is not nearly as effective as when 50% of the particles have an equivalent spherical diameter within the preferred ranges and exist as essentially discrete particles. When the Attapulgus fuller's earth is agglomerated the large surface area of the mineral is not available and a specific quantity of agglomerated material has substantially less covering power than a corresponding amount of non-agglomerated material. The conditioner used in compositions of my invention has a low bulk packaged density, within the range of from about 15–18 pounds per cubic foot. Satisfactory earth conditioners are characterized by the following particle size distribution:

| Particle Size Distribution Equivalent Spherical Diameter in Microns | Percent by Weight Finer Than— | | |
| --- | --- | --- | --- |
| | Coarse Sample | Preferred Range | Fine Sample |
| 20 | 75 | 80–95 | 98 |
| 15 | 50 | 65–80 | 90 |
| 10 | 45 | 55–70 | 85 |
| 5 | 18 | 20–35 | 60 |
| 3 | 0 | 10–25 | 35 |

Furthermore, I have found that milling the activated earth to a substantially identical particle size distribution by techniques other than fluid energy milling fails to provide an equivalent or satisfactory product in that the finely-divided earth is not possessive of the requisite tenacity to adhere satisfactorily to the fertilizer. Likewise air-fractioned clay of comparable particle size distribution lacks the requisite adhesion to granular hygroscopic material.

Although I do not wish in any way to be bound by the hypothesis hereinafter set forth it is believed that the basis of the phenomenon is that the fluid energy milled product acquires an electrostatic charge which aids the finely-divided earth to cling to the substrate.

The activated finely-divided Attapulgus fuller's earth, being of a highly sorptive nature and being so disposed on the surface of the hygroscopic material as to form a continuous water-sorptive barrier around each particle of the fertilizer, sorbs water preferentially to the absorption of water by the fertilizer.

I preferably admix the finely-divided mineral with the fertilizer after curing and before the fertilizer is bagged. Excellent results are obtained by adding to the fertilizer the finely-divided mineral above-described in an amount of the order of about 0.5 to 3% of the weight of the fertilizer, although about 0.5 to 1.5% will ordinarily produce outstanding results. Of course the weight ratio of conditioner to fertilizer will depend, inter alia, on the fineness of the coating material, the amount of free surface per unit weight of fertilizer and the severity of moisture or moisture, temperature and pressure conditions which the conditioner must counteract. In putting my invention into practice fertilizer granules are dried and agitated with the pulverant conditioning agent for a time sufficient to cause the pulverant material to accumulate on the surfaces of the fertilizer granules and by virtue of the high affinity of the particulated conditioner for the granule surface, to build up a firm compacted layer thereon. The agitation may be carried out at room temperature or at an elevated temperature which is below the fusion temperature of the treated material or a component thereof.

Fertilizer compositions made in accordance with the practice of my invention suitably include those having as active ingredients at least one of the following: ammonium nitrate, ammonium phosphate, urea, ammonium sulfate, potassium chloride, and acidulated phosphate rock such as superphosphate and triple-phosphate. The granules preferably lie within the range of from about 5 to 35 mesh although smaller and larger granules may be benefited by the novel coating material of my invention.

The following examples are given only for the sake of further illustrating the invention and are not to be construed as limiting the scope thereof.

EXAMPLE I

A conditioned fertilizer of the instant invention is prepared by agitating dry ammonium nitrate prills with 1.5% by weight of calcined Attapulgus fuller's earth fluid energy milled with air to an average equivalent spherical diameter of 8 microns and in which 30 percent of the material was less than 5 microns and 15 percent was smaller than 3 microns. The process is carried out in a rotating drum below the fusion temperature of the ammonium nitrate. The resultant conditioned prills will display outstanding resistance to coalescence.

EXAMPLE II

Another composition of the invention is prepared by using granular superphosphate in lieu of the ammonium nitrate of Example I and 1.0% by weight of calcined Attapulgus fuller's earth (about 7% V.M. as produced) having the following particle size distribution: finer than 20 microns, 95 percent by weight; finer than 15 microns, 90 percent by weight; finer than 10 microns, 85 percent by weight; finer than 5 microns, 60 percent by weight; finer than 3 microns, 25 percent by weight. The conditioning effect of a like amount of finer earth, e.g., one in which substantially all of the material is finer than 15 microns but a major weight percentage is finer than 2.9 microns, is inferior.

My finely-divided fluid energy milled heat activated mineral may also be used for individually coating the particles of other discrete materials which due to the action of moisture in the surrounding atmosphere tend to coalesce. Examples of other discrete materials are resins which coalesce in the presence of moisture, cattle food, sugar, chlorates, etc.

While I have described certain preferred embodiments of my invention it is to be distinctly understood that the invention is not limited thereto but may be otherwise variously embodied within the scope of the following claims.

I claim:

1. A composition of matter comprising discrete particles of a material which tend to coalesce, individual particles of said material being coated with heat activated attapulgite clay, said attapulgite clay being present in an amount of from 0.5 percent to 3 percent based on the weight of said material and having been fluid energy ground wherein said clay is reduced in size by high velocity particle impact to a fineness such that a preponderating amount by weight of the particles thereof is finer than about 15 microns and the amount finer than 5 microns is a minor proportion.

2. A composition of matter comprising discrete particles of a fertilizer which tend to coalesce, individual particles of said fertilizer being coated with heat activated attapulgite clay, said attapulgite clay being present in an amount of from 0.5 percent to 3 percent based on the weight of said fertilizer and having been fluid energy ground wherein said clay is reduced in size by high velocity particle impact to a fineness such that a preponderating amount by weight of the particles thereof is finer than about 15 microns and the amount finer than 5 microns is a minor proportion, individual particles of said attapulgite clay forming a continuous tenacious barrier around each particle of said fertilizer.

3. The composition of claim 2 in which the fertilizer comprises ammonium nitrate.

4. The composition of claim 2 in which the fertilizer comprises acidulated phosphate rock.

5. The composition of claim 2 in which the fertilizer comprises ammonium phosphate.

6. The composition of claim 2 in which the fertilizer comprises urea.

7. The composition of claim 2 in which the fertilizer comprises potassium chloride.

8. A composition of matter comprising granules of a material which tend to coalesce, individual granules of said material being coated with heat activated attapulgite clay, and attapulgite clay being present in an amount of from 0.5 percent to 3 percent based on the weight of said material and having been fluid energy ground wherein said clay is reduced in size by high velocity particle impact to a fineness such that about 50 to 90 percent by weight of the particles thereof is finer than 15 microns, 45 to 85 percent is finer than 10 microns, 18 to 60 percent is finer than 5 microns and 0 to 35 percent is finer than 3 microns, individual particles of said clay forming a continuous tenacious barrier around each of said granules.

9. The method of preventing discrete particles of a water-soluble material from coalescing due to heat, pressure or moisture in the surrounding atmosphere which comprises coating the particles of said material with a finely divided heat activated attapulgite clay, said attapulgite clay being present in an amount of from 0.5 percent to 3 percent based on the weight of said material and having been fluid energy ground wherein said clay is reduced in size by high velocity particle impact to a fineness such that about 80 to 95 percent by weight of the particles thereof is finer than 20 microns, 65 to 80 percent is finer than 15 microns, 55 to 70 percent is finer than 10 microns, 20 to 35 percent is finer than 5 microns and 10 to 35 percent is finer than 3 microns, individual particles of said clay forming a continuous tenacious barrier around each particle of said first-mentioned material inhibiting absorption of moisture by the first-mentioned material.

10. The method of claim 9 in which said water-soluble material is a fertilizer.

References Cited in the file of this patent

UNITED STATES PATENTS

| | | |
|---|---|---|
| 2,088,281 | Smith | July 27, 1937 |
| 2,296,689 | Soderberg | Sept. 22, 1942 |
| 2,305,404 | Brown | Dec. 15, 1942 |
| 2,307,239 | Rowland | Jan. 5, 1943 |
| 2,399,987 | Cordie et al. | May 7, 1946 |
| 2,498,353 | Bierce | Feb. 21, 1950 |
| 2,498,480 | Bierlich | Feb. 21, 1950 |
| 2,676,892 | McLaughlin | Apr. 27, 1954 |
| 2,702,747 | Studebaker | Feb. 22, 1955 |